United States Patent
Bailey et al.

(10) Patent No.: US 6,996,316 B2
(45) Date of Patent: Feb. 7, 2006

(54) LARGE DIAMETER D-SHAPED OPTICAL WAVEGUIDE AND COUPLER

(75) Inventors: Timothy J. Bailey, Longmeadow, MA (US); Robert N. Brucato, Cheshire, CT (US); Alan D. Kersey, South Glastonbury, CT (US); Martin A. Putnam, Cheshire, CT (US); Paul Sanders, Madison, CT (US); James Sullivan, East Hampton, CT (US)

(73) Assignee: CiDRA Corporation, Wallingford, CT (US)

( * ) Notice: Subject to any disclaimer, the term of this patent is extended or adjusted under 35 U.S.C. 154(b) by 390 days.

(21) Appl. No.: 10/098,891

(22) Filed: Mar. 18, 2002

(65) Prior Publication Data

US 2002/0197037 A1 Dec. 26, 2002

Related U.S. Application Data (63) Continuation-in-part of application No. 09/455,868, filed on Dec. 12, 1999, which is a continuation-in-part of application No. 09/455,865, filed on Dec. 6, 1999, which is a continuation-in-part of application No. 09/399,495, filed on Sep. 20, 1999, now abandoned, which is a continuation-in-part of application No. 09/205,943, filed on Dec. 4, 1999, now abandoned.

(60) Provisional application No. 60/276,457, filed on Mar. 16, 2001.

(51) Int. Cl.
*G02B 6/02* (2006.01)
*G02B 6/34* (2006.01)
*G02B 6/22* (2006.01)
*H01S 3/067* (2006.01)

(52) U.S. Cl. .................... 385/123; 385/37; 385/126; 385/146; 372/6

(58) Field of Classification Search ............. 385/30, 385/37, 123, 126, 127, 142, 146; 372/6
See application file for complete search history.

(56) References Cited

U.S. PATENT DOCUMENTS 3,891,302 A   6/1975   Kestenbaum et al. ......... 350/96

(Continued)

FOREIGN PATENT DOCUMENTS

DE   19724528   12/1998

(Continued)

V.C. Lauridsen, J.H. Povlsen and P. Varming "Design of DFB Fibre Lasers", Electron Lett., vol. 34, No. 21, pp. 2028–2030, 1998.

(Continued)

*Primary Examiner*—Brian Healy
*Assistant Examiner*—Omar Rojas (57) ABSTRACT

A large diameter D-shaped optical waveguide device 9, includes an optional circular waveguide portion 11 and a D-shaped waveguide portion 10 having at least one core 12 surrounded by a cladding 14. A portion of the waveguide device 9 has a generally D-shaped cross-section and has transverse waveguide dimension d2 greater than about 0.3 mm. At least one Bragg grating 16 may be impressed in the waveguide 10 and/or more than one grating or pair of gratings may be used and more than one core may be used. The device 9 provides a sturdy waveguide platform for coupling light into and out of waveguides and for attachment and alignment to other waveguides, for single and multi-core applications. The core and/or cladding 12,14 may be doped with a rare-earth dopant and/or may be photosensitive. At least a portion of the core 12 may be doped between a pair of gratings 50,52 to form a fiber laser or the grating 16 or may be constructed as a tunable DFB fiber laser or an interactive fiber laser within the waveguide 10. The waveguide may resemble a short "block" or a longer "cane" type, depending on the application and dimensions used.

30 Claims, 6 Drawing Sheets

U.S. PATENT DOCUMENTS

| | | | |
|---|---|---|---|
| 3,912,363 A | 10/1975 | Hammer | |
| 3,916,182 A | 10/1975 | Paek et al. | 250/199 |
| 4,295,739 A | 10/1981 | Meltz et al. | 356/43 |
| 4,669,814 A * | 6/1987 | Dyott | 385/42 |
| 4,704,151 A | 11/1987 | Keck | 65/4.1 |
| 4,737,007 A | 4/1988 | Alferness et al. | |
| 4,762,392 A | 8/1988 | Yamamoto et al. | 350/96.3 |
| 4,915,467 A | 4/1990 | Berkey | 350/96.15 |
| 4,948,217 A | 8/1990 | Keck et al. | 350/96.15 |
| 5,007,705 A | 4/1991 | Morey et al. | |
| 5,042,898 A | 8/1991 | Morey et al. | 385/37 |
| 5,125,946 A | 6/1992 | Bhagavatula | 65/106 |
| 5,136,677 A | 8/1992 | Drexhage et al. | 385/123 |
| 5,187,760 A | 2/1993 | Huber | |
| 5,235,659 A | 8/1993 | Atkins et al. | 385/124 |
| 5,237,638 A | 8/1993 | Narcisco | 385/123 |
| 5,469,520 A | 11/1995 | Morey et al. | 385/37 |
| 5,479,551 A | 12/1995 | DiGiovanni et al. | 385/123 |
| 5,511,083 A | 4/1996 | D'Amato et al. | 372/6 |
| 5,519,801 A | 5/1996 | Le Noane et al. | 385/115 |
| 5,519,803 A | 5/1996 | Shiono | 385/132 |
| 5,666,372 A | 9/1997 | Ball et al. | 372/6 |
| 5,682,453 A | 10/1997 | Daniel et al. | 385/99 |
| 5,691,999 A | 11/1997 | Ball et al. | |
| 5,699,377 A | 12/1997 | Pan | 372/92 |
| 5,745,626 A | 4/1998 | Duck et al. | 385/96 |
| 5,771,251 A | 6/1998 | Kringlebotn et al. | 372/6 |
| 5,817,944 A | 10/1998 | Chung | 73/768 |
| 5,841,131 A | 11/1998 | Schroeder et al. | 250/227.17 |
| 5,864,645 A * | 1/1999 | Zellmer et al. | 385/126 |
| 5,933,437 A | 8/1999 | Delavaux | 372/6 |
| 6,018,534 A | 1/2000 | Pan et al. | 372/6 |
| 6,229,827 B1 | 5/2001 | Fernald et al. | 372/20 |
| 6,597,821 B1 * | 7/2003 | Bohnert et al. | 385/12 |
| 6,718,097 B2 * | 4/2004 | Dyott | 385/49 |

FOREIGN PATENT DOCUMENTS

| | | |
|---|---|---|
| DE | 19860410 A1 * | 6/2000 |
| EP | 0352751 | 1/1990 |
| EP | 0212954 | 9/1991 |
| EP | 0162303 | 12/1991 |
| EP | 0359351 | 9/1992 |
| EP | 0302745 | 3/1994 |
| EP | 0409447 | 11/1996 |
| EP | 0884614 | 6/1997 |
| WO | WO8204328 | 12/1982 |
| WO | WO9530926 | 11/1995 |
| WO | WO 9950696 A2 * | 10/1999 |
| WO | WO 0037969 | 6/2000 |

OTHER PUBLICATIONS

P. Varming, J. Hubner and M. Sejka, "Erbium doped fibre DFB laser with permanent $\pi/2$ phase–shift induced by UV post–processing", IOOC'95, Tech. Digest, vol. 5, PDI–3, 1995.

J.L. Cruz, L. Dong and L. Reekie "Improved thermal sensitivity of fibre Bragg gratings using a polymer over-layer", Electronics Letters, vol. 32, No. 4, pp. 385–387.

"Bragg Grating Fast Tunable Filter for Wavelength Division Multiplexing", by Iocco et al, Journal of Lightwave Technology, vol. 17, No. 17, Jul. 1999.

"Interactive Fiber Laser with Low Noise and Controlled Output Power", E–TEK Dynamics/Whitepapers, by Pan et al, Nov. 1999.

* cited by examiner

LARGE DIAMETER D-SHAPED OPTICAL WAVEGUIDE AND COUPLER

CROSS REFERENCES TO RELATED APPLICATIONS

This application is a continuation-in-part of U.S patent application Ser. No. 09/455,868, filed Dec. 12, 1999, which is a continuation-in-part of U.S patent application Ser. No. 09/455,865, filed Dec. 6, 1999, which is a continuation-in-part of U.S. patent application Ser. No. 09/399,495, filed Sep. 20, 1999, now abandoned, which is continuation in part of U.S. patent application Ser. No. 09/205,943, filed Dec. 4, 1998, now abandoned; and claims the benefit of U.S. Provisional Application No. 60/276,457, filed Mar. 16, 2001, all of which are incorporated herein by reference in their entirety.

TECHNICAL FIELD

This invention relates to optical waveguides and couplers, and more particularly to optical waveguides and couplers, having a large outer diameter and substantially D-shaped.

BACKGROUND ART

It is known that optical fibers having non-circular cross-sectional outer shapes, such as a D-shaped fiber, are used for various purposes, such as coupling light (or the evanescent field) into and/or out of the fiber and/or for mechanically determining, orienting or aligning the polarization states of a fiber. Some uses of such D-shaped fiber is discussed in U.S. Pat. Nos. 4,386,822; 4,054,366; 4,669,814; 4,387,954; 4,589,725; 4,054,366; 3,887,264; 3,823,997, all of which are incorporated herein by reference in their entirety. However, in such cases, the fiber is either highly lossy or very difficult to manufacture and/or very difficult to use because they are very delicate and fragile. In particular, when a portion of a cladding of an optical fiber is removed to create a D-shaped fiber portion, it is very fragile due to the very small diameter of the cladding, e.g., about 125 microns.

SUMMARY OF THE INVENTION

Objects of the present invention include provision of an optical waveguide that permits access to the evanescent field and is easy to use and manufacture.

According to the present invention, an optical waveguide includes an outer cladding having at least one inner core disposed therein, which propagates light in substantially a few spatial modes. A portion of the optical waveguide has a generally D-shaped cross-section and a transverse outer waveguide dimension that is greater than about 0.3 mm.

The present invention provides a significant improvement over prior art optical fibers by providing a glass (or silica-based) optical waveguide having a D-shape and a large outer dimension which allows for access to the evanescent field and/or attachment or alignment of the waveguide without the problems associated with D-shaped optical fiber. The invention provides a flat surface for access to the evanescent field for optical coupling into or out of the waveguide, and/or for attachment or alignment purposes. The waveguide may resemble a short "block" or a longer "cane" type, depending on the application and dimensions used.

The large outer diameter of the D-shaped waveguide, has inherent mechanical rigidity which improves packaging options and reduces bend losses. Also, the large outer diameter allows the waveguide to resist damage from handling which typical bare optical fibers would exhibit. Also, the D-shaped waveguide may be made in long lengths (on the order of many inches, feet, or meters) then cut to size as needed for the desired application. Also, the large D-shaped waveguide size allows the waveguide to be further ground, polished etched or machined while retaining its mechanical strength. Also, the waveguide has a large end surface area to attach an optical fiber pigtail to the waveguide or for attaching multiple optical fibers to multiple cores in the waveguide. Further, because the waveguide has a large outer diameter compared to that of a standard optical fiber (e.g., about 125 microns), the waveguide does not need to be coated with a buffer (or jacket) and then stripped to form the D-shape or to write gratings therein, thereby requiring less steps than that needed for conventional optical optical fibers, and preserving the structural integrity and optical properties of the waveguide. Thus, the present invention is easily manufacturable and easy to handle.

Further, the invention provides some advantages for grating writing into the waveguide in the D-shaped section due to the flat surface, such as lower power, better optical absorption by the core, and/or easier alignment. In addition, the invention allows for the creation of multi-core devices and couplers.

One or more gratings may be embedded (or imprinted) in the D-shaped waveguide. Also, one or more gratings or a plurality of cores or concentric or ring cores, may be located within the waveguide cladding, thereby allowing for multiple waveguiding paths within the waveguide.

The foregoing and other objects, features and advantages of the present invention will become more apparent in light of the following detailed description of exemplary embodiments thereof.

BEST MODE FOR CARRYING OUT THE INVENTION

Referring to FIGS. 1–4, a large diameter D-shaped optical waveguide device 9, has a D-shaped waveguide portion 10, a circular waveguide portion 11, and has at least one core 12 surrounded by a cladding 14. The waveguide device 9 comprises silica glass ($SiO_2$) based material having the appropriate dopants, as is known, to allow light 15 to propagate in either direction along the core 12 and/or within the waveguide device 9. The core 12 has an outer dimension d1 and the waveguide device 9 has an outer dimension d2.

The cladding 14 has an outer dimension d2 of at least about 0.3 mm and the core 12 has an outer dimension d1 such that it propagates only a few spatial modes (e.g., less than about 6). For example for single spatial mode propagation, the core 12 has a substantially circular transverse cross-sectional shape with a diameter d1 less than about 12.5 microns, depending on the wavelength of light. One standard telecommunications nominal core diameter is 9 microns (and outer waveguide diameter of 125 microns). The invention will also work with larger or non-circular cores that propagate a few (less than about 6) spatial modes, in one or more transverse directions. Further, the optical waveguide device 9 may be a birefringent, polarization maintaining, polarizing, multi-core, or multi-cladding optical waveguide (discussed more hereinafter). Also, the core 12 of the waveguide device 9 need not be located in the center (left-to-right) of the waveguide device 9 but may be located anywhere in the waveguide device 9 that provides the functions described herein.

Also, other materials for the optical waveguide device 9 may be used if desired. For example, the waveguide 10 may be made of any glass material, e.g., silica, phosphate glass, or other glasses, or made of solely plastic. For high temperature applications, an optical waveguide made of a glass material is desirable. Also, the waveguide 10 may resemble a short "block" type or a longer "cane" type geometry, depending on the length of the waveguide and outer dimension of the waveguide.

Figures 1, 2:
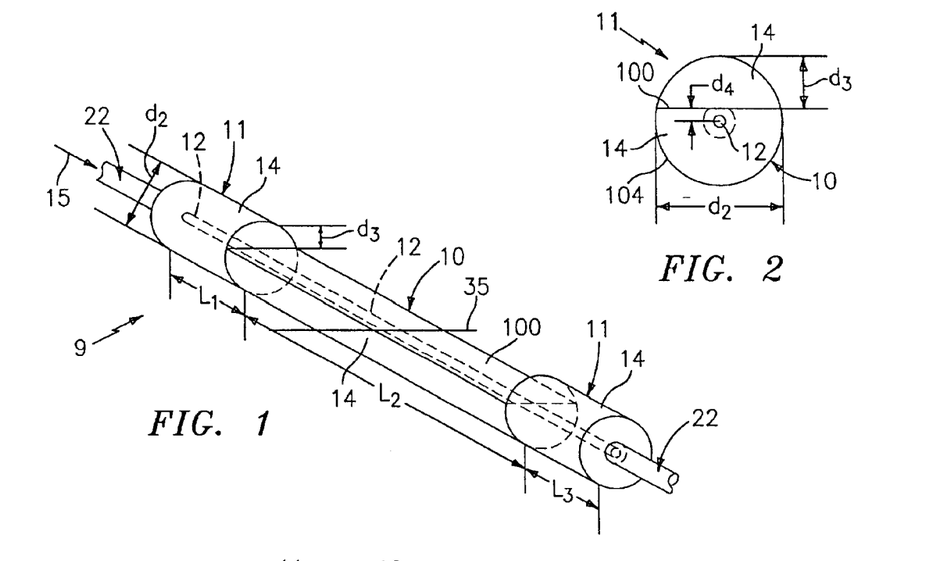
FIG. 1 is a perspective view of a large diameter D-shaped optical waveguide, in accordance with the present invention.
FIG. 2 is a cross-section of a large diameter D-shaped optical waveguide, in accordance with the present invention.
Figure 3:
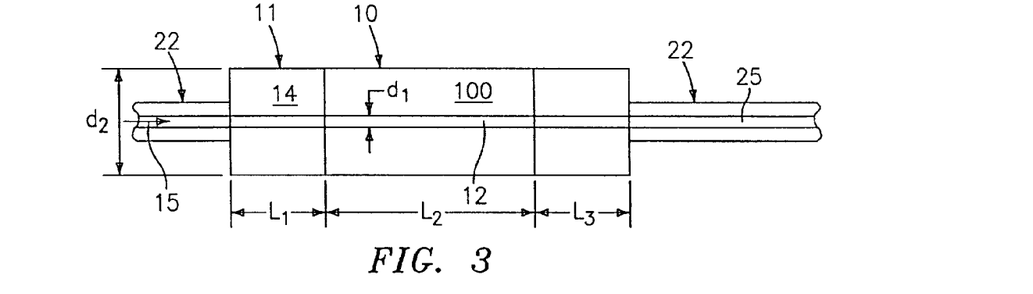
FIG. 3 is a top view of a large diameter D-shaped waveguide, in accordance with the present invention.
Figure 4:
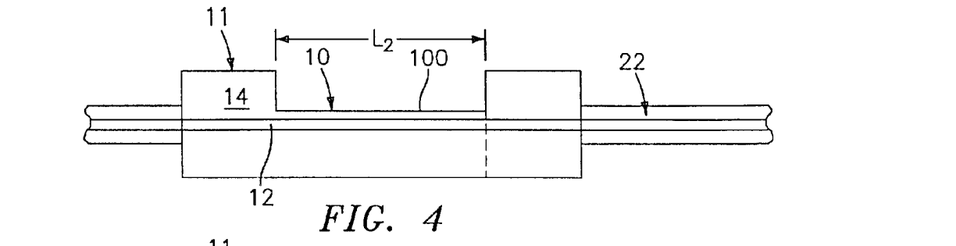
FIG. 4 is a side view of a large diameter D-shaped waveguide, in accordance with the present invention.
Figure 5:
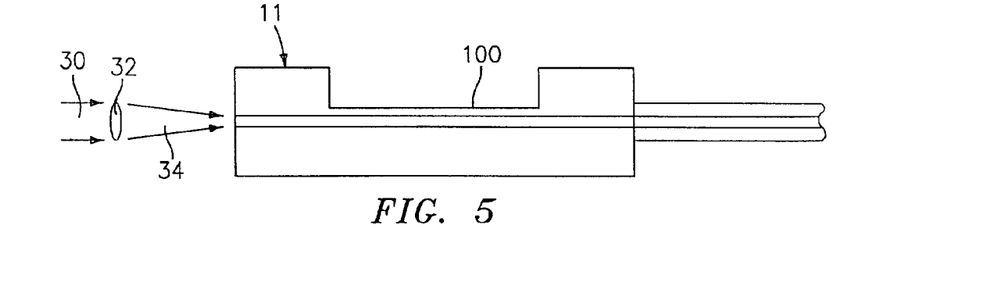
FIG. 5 is a side view of a large diameter D-shaped waveguide having a free space optical input, in accordance with the present invention.
Figures 6, 7, 8, 9:
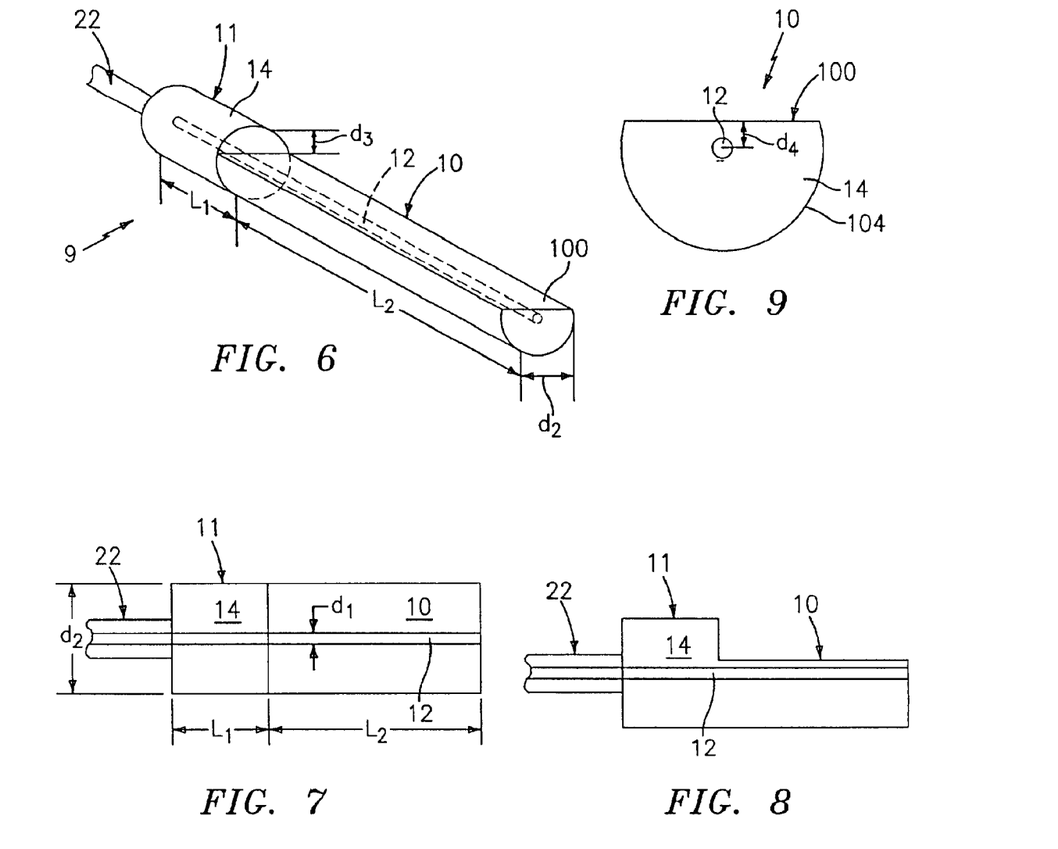
FIG. 6 is a perspective view of a large diameter D-shaped single pigtail ended optical waveguide, in accordance with the present invention.
FIG. 7 is a top view of a large diameter D-shaped single pigtail ended waveguide, in accordance with the present invention.
FIG. 8 is a side view of a large diameter D-shaped single pigtail ended waveguide, in accordance with the present invention.
FIG. 9 is an end cross-section view of a large diameter D-shaped optical waveguide having a single optical cores, in accordance with the present invention.

Incoming light 15 may be launched into the waveguide 10 and/or the core 12 by splicing a suitable standard optical fiber 22 (having a cladding 26 and a core 25 ) to one or both axial ends 28 of either the circular portion 11 of the waveguide or D-shaped portion 10 of the waveguide (discussed herein after) using any known or yet to be discovered techniques for splicing fibers or coupling light from an optical fiber into a larger waveguide, that provides acceptable optical losses for the application. Referring to FIG. 5, instead of using an optical fiber, incident light 34 may be directly incident on the core or be focussed into the core 12 by a lens 32, which focuses input light 30. FIGS. 6–8, show the case where the optical fiber 22 is attached (or pigtailed) to only one end of the circular waveguide portion 11.

The large diameter (or cane) circular waveguide portion 11 has a length L1 and a diameter D2 and provides an optical interface to allow easy axial coupling (or pigtailing) of the optical fiber 22 to the D-shaped waveguide portion 10. The circular portion 11 is only required if the distance d4 of the large diameter D-shaped waveguide portion 10 does not allow enough space for the fiber 22 to be attached, provided a fiber is used for carrying the light into or out of the waveguide device 9.

The D-shaped portion 10 has a flat surface 100 and a rounded outer surface 104, and has a length L2 and the outer transverse waveguide dimension D2 which are determined by the application and the desired rigidity of the device.

The D-shaped portion 10 is used to couple light into or out of the core 12 or couple with the evanescent field of the light in the cladding 14 (discussed more hereinafter). The D-shaped portion 10 may also or alternatively be used to orient the waveguide along a predetermined polarization axis. The flat surface 100 may be spaced any predetermined distance d4 from the center of the core 12. However, for coupling the evanescent field, the distance d4 should be no more than about 3 average core diameters.

Figure 15:
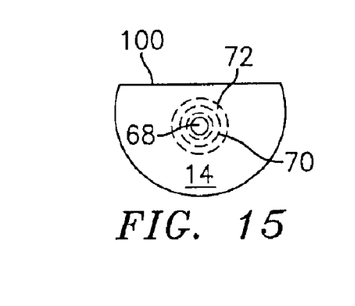
FIG. 15 is an end view of a large diameter D-shaped optical waveguide having a plurality of concentric optical cores, in accordance with the present invention.

Referring to FIG. 15, the waveguide may have multiple concentric cores 68,70 or a ring or annulus core 72 (or inner claddings). In that case, the dimension d1 for calculating the minimum dimension for the core would be the core having the smallest outer dimension. As used herein, the term "waveguiding region" refers to the core and any additional cores or inner claddings or outer cores that serve to guide the light in the waveguide.

Figure 10:
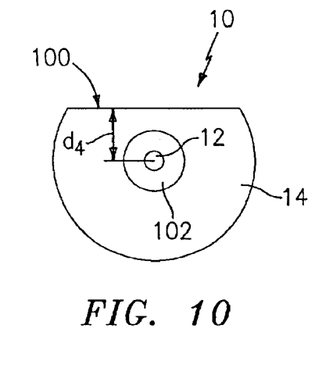
FIG. 10 is an end cross-section view of a large diameter D-shaped optical waveguide having an optical core and an inner cladding, in accordance with the present invention.
Figure 11:
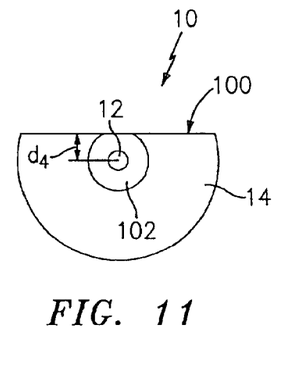
FIG. 11 is an end cross-section view of a large diameter D-shaped optical waveguide having an optical core and an inner cladding which is partially removed, in accordance with the present invention.
Figure 12:
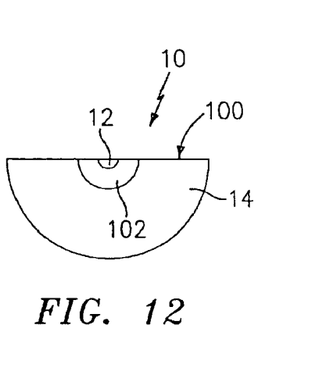
FIG. 12 is an end cross-section view of a large diameter D-shaped optical waveguide having an optical core and an inner cladding, in accordance with the present invention.
Figure 13:
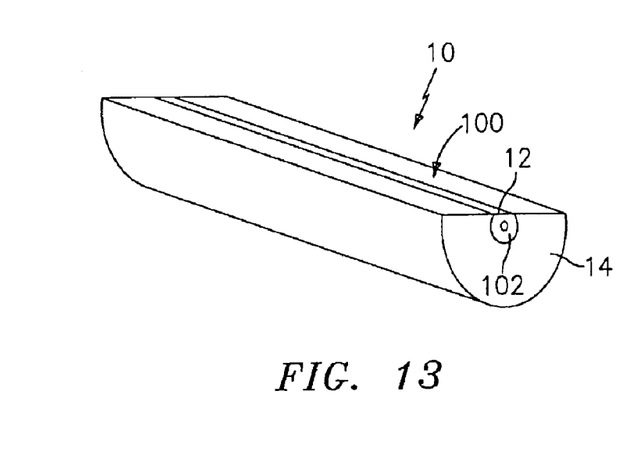
FIG. 13 is a perspective view of a large diameter D-shaped optical waveguide having an optical core and an inner cladding, in accordance with the present invention.
Figure 14:
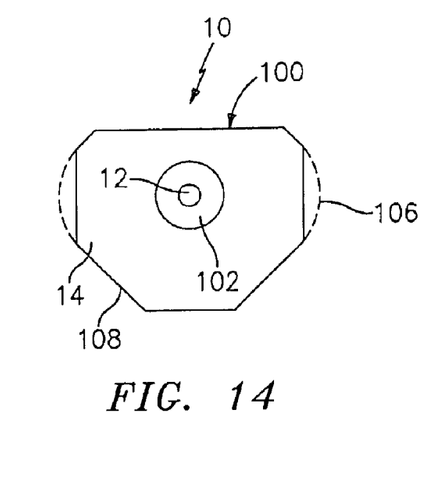
FIG. 14 is an end cross-section view of a large diameter D-shaped optical waveguide having a substantially D-shaped geometry, in accordance with the present invention.

For example, FIGS. 9 and 10 illustrates the flat surface 100 passing through only the outer cladding 14 of the D-shaped waveguide 10. Alternatively, the flat surface 100 may pass through both an inner cladding 102 and the outer cladding 14 as shown in FIGS. 12 and 14. The flat surface 100 may even pass through the core 12, inner cladding 102 and outer cladding 14 as shown in FIG. 12.

FIGS. 10–14 illustrate a D-shaped waveguide 10 having an inner core 12, an inner cladding 102 disposed around the core, and an outer cladding 14 disposed around the inner cladding. In FIG. 10, the waveguide 10 is formed to efficiently allow light to propagate along its length with minimal losses from the inner cladding 102. To this end, the waveguide 10 has various refractive indices through its cross section. For example, in one embodiment, the outer cladding 14 has the lowest refractive index, the core 12 has the highest refractive index and the inner cladding 102 has a refractive index higher than the outer cladding 14, but lower than the refractive index of the core. Other configurations are possible, including matched indices and depressed inner clad designs, wherein the index of refraction of the inner cladding is less than the index of refraction of the outer cladding, which are contemplated within the scope of the present invention.

While the D-shaped waveguides 10 described hereinbefore includes a flat surface 100 and a rounded outer cladding 14, the present invention contemplates other shapes for the rounded outer cladding portion 104. For instance, FIG. 14 illustrates a D-shaped waveguide 10 wherein the outer cladding 14 has sections 108 of the outer perimeter 104 that are flat, such as a polygonal shape, or partially rounded as shown by the lines 106, provided the shape is not a planar waveguide (rectangular) shape.

Figure 16:
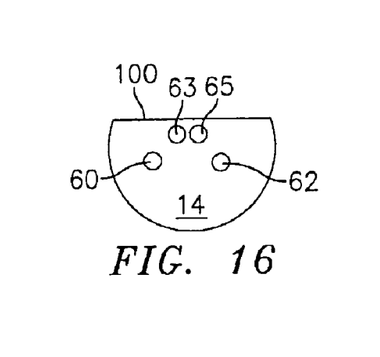
FIG. 16 is an end cross-section view of a large diameter D-shaped optical waveguide having a plurality of optical cores, in accordance with the present invention.

Referring to FIG. 16, alternatively, two or more cores 60,62,63,65 may be located within the waveguide 10. The core 12 (FIGS. 1–4) may be positioned axially anywhere within the waveguide 10 and need not be centered along the center line of the waveguide 10. Also, cores (FIG. 5) may be located close to each other (to be substantially touching or optically coupling to each other) as shown by the cores 63,65, and/or separated by any desired distance within the waveguide 10, as shown by cores 60,62. For multiple cores with different diameters, each of the cores should meet the requirements described herein for the core 12.

Figure 17:
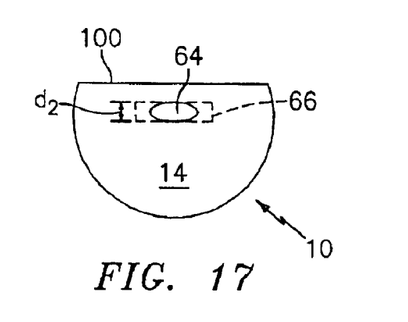
FIG. 17 is an end view of a large diameter D-shaped optical waveguide having an elliptical core, in accordance with the present invention.
Figure 18:
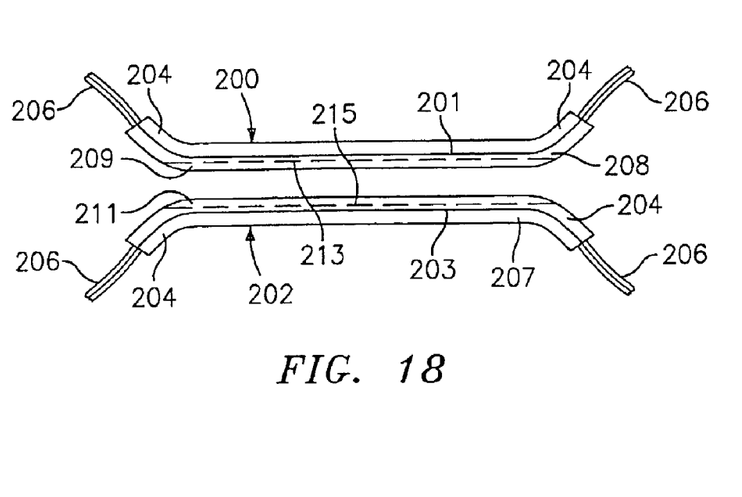
FIG. 18 is a side view of two large diameter D-shaped optical waveguides, in accordance with the present invention.
Figure 19:
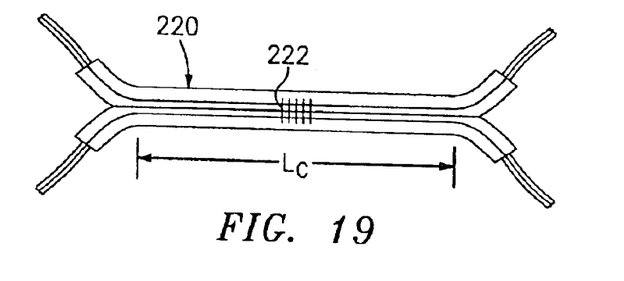
FIG. 19 is a side view of a four port coupler formed from the two large diameter D-shaped optical waveguides of FIG. 18, in accordance with the present invention.

Referring to FIG. 17, alternatively, the core 12 may have an asymmetrical end cross-sectional shape such as elliptical shape 64 or a rectangular shape 66. For asymmetrical end cross-sectional shapes, the smaller dimension d1 would be used for determining the maximum core dimension. In that case, the core may propagate only one mode in the direction of the dimension d1 and propagate a few modes in the other direction. Also, the end cross-sectional shape of the core 12 may have other shapes such as a square, clam-shell, octagonal, multi-sided, or any other desired shapes.

Figure 28:
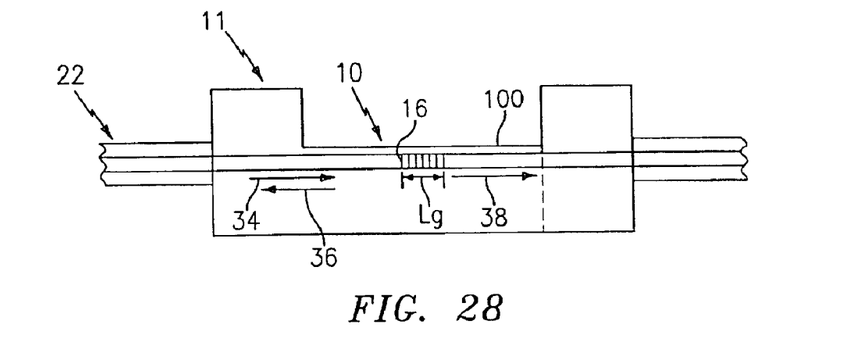
FIG. 28, is a side view of a large diameter D-shaped optical waveguide having a grating therein, in accordance with the present invention.

Referring to FIG. 28, the waveguide 10 may have a Bragg grating 16 impressed (or embedded or imprinted) therein. The Bragg grating 16, as is known, is a periodic or aperiodic variation in the effective refractive index and/or effective optical absorption coefficient of an optical waveguide, such as that described in U.S. Pat. No. 4,725,110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, which are hereby incorporated by reference to the extent necessary to understand the present invention. The grating 16 may be in the core 12 and/or in the cladding 14 (see FIG. 30). Any wavelength-tunable grating or reflective element embedded, etched, imprinted, or otherwise formed in the waveguide 10 may be used if desired. The waveguide 10 may be photosensitive if a grating 16 are to be written into the waveguide 10. As used herein, the term "grating" means any of such reflective elements. Further, the reflective element (or grating) 16 may be used in reflection and/or transmission of light.

The grating 16 has a grating length Lg, which is determined based on the application and may be any desired length. A typical grating 16 has a grating length Lg in the range of about 3–40 mm. Other sizes or ranges may be used if desired. The length Lg of the grating 16 may be shorter than or substantially the same length as the length L of the waveguide 10.

Figure 29:
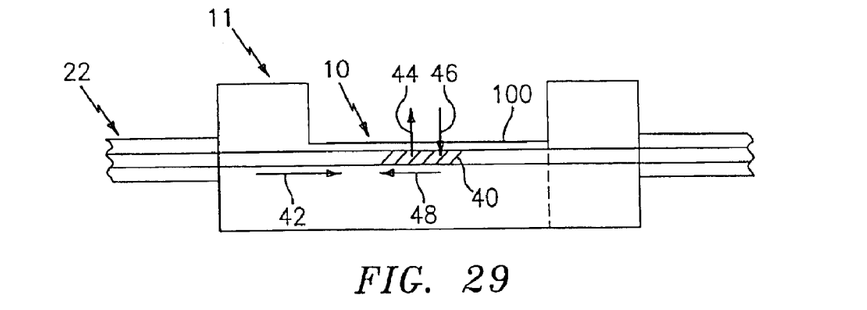
FIG. 29, is a side view of a large diameter D-shaped optical waveguide having a blazed grating therein, in accordance with the present invention.

If a grating 16 is in the waveguide 10, light 34 is incident on the grating 16 which reflects a portion thereof as indicated by a line 36 having a predetermined wavelength band of light, and passes the remaining wavelengths of the incident light 34 (within a predetermined wavelength range), as indicated by a line 38 (as is known). Referring to FIG. 29, a blazed grating 40 may be disposed in the waveguide 10 having a blaze angle with respect to the longitudinal axis of the waveguide 10, such as is described in U.S. Pat. No. 5,042,897, "Optical Waveguide Embedded Light Redirecting Bragg Grating Arrangement", issued Aug. 27, 1991; and U.S. Pat. No. 5,061,032 "Optical Waveguide Embedded Light Redirecting And Focusing Bragg Grating Arrangement" issued Oct. 29, 1991, both to Meltz et al, which are incorporated herein by reference. As is known a blazed grating 40 reflects a predetermined wavelength band of incident light 42 out of the waveguide as indicated by a line 44. Also, the blazed grating 40 couples incident light 26 at this predetermined wavelength into the waveguide as indicated by a line 48.

Figure 30:
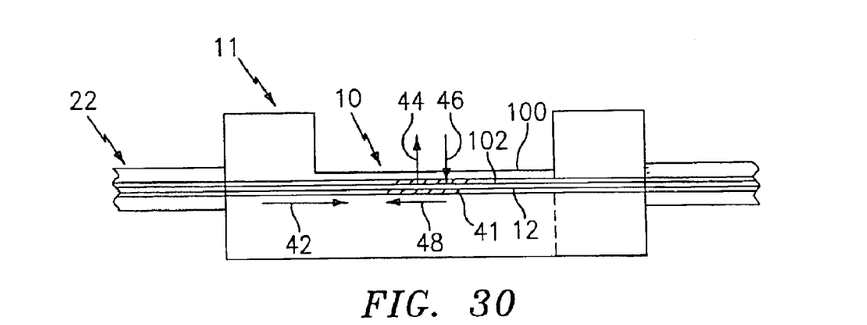
FIG. 30, is a side view of a large diameter D-shaped optical waveguide having an alternative blazed grating therein, in accordance with the present invention.

Referring to FIG. 30, alternatively, a blazed grating 41 may reside partially or completely in the inner cladding 102, and performs the same basic function as that described with FIG. 28; however, it may have less back-reflection, such as is described in copending U.S. patent application Ser. No. 10/098,890, filed contemporaneously herewith (and incorporated herein by reference) and in I. Riant, et al, "New and efficient technique for suppressing the peaks induced by discrete cladding mode coupling in fiber slanted Bragg grating spectrum", Optical Fiber Communication Conference 2000, pgs. 118/TuH3-1 to 120/TuH3-3, which is incorporated herein by reference.

Figure 31:
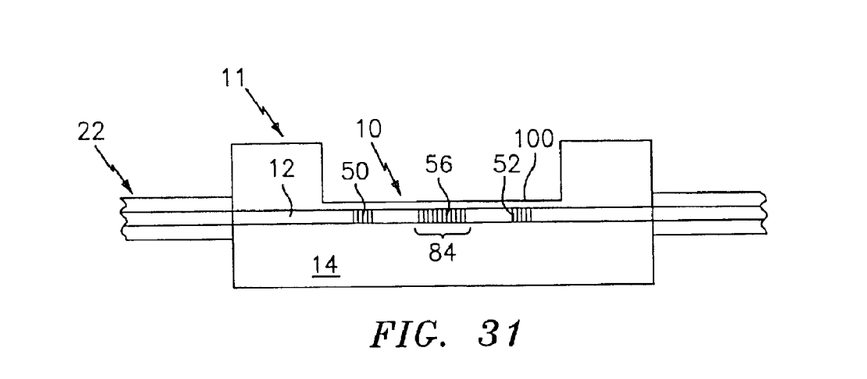
FIG. 31, is a side view of a large diameter D-shaped optical waveguide having a plurality of gratings therein, in accordance with the present invention.

Referring to FIG. 31, for any of the embodiments described herein, instead of a single grating within the waveguide 10, two or more gratings 50,52 may be embedded in the waveguide 10. The gratings 50,52 may have the same reflection wavelengths and/or profiles or different wavelengths and/or profiles. The multiple gratings 50,52 may be used individually in a known Fabry Perot arrangement.

Further, one or more fiber lasers, such as that described in U.S. Pat. Nos. 5,305,335, "Single Longitudinal Mode Pumped Optical Waveguide Laser Arrangement" (which is incorporated herein by reference to the extent necessary to understand the present invention) may be in the D-shaped waveguide 10. In that case, the gratings 50,52 form a cavity and the waveguide 10 at least between the gratings 50,52 (and may also include the gratings 50,52, and/or the waveguide 10 outside the gratings, if desired) at least a portion of which is doped with a rare earth dopant, e.g., erbium and/or ytterbium, etc.

Another type of fiber laser that may be used is a distributed feedback (DFB) fiber laser, such as that described in V. C. Lauridsen, et al, "Design of DFB Fibre Lasers", Electronic Letters, Oct. 15, 1998, Vol.34, No. 21, pp 2028–2030; P. Varming, et al, "Erbium Doped Fiber DGB Laser With Permanent $\pi/2$ Phase-Shift Induced by UV Post-Processing", IOOC'95, Tech. Digest, Vol. 5, PD1-3, 1995; U.S. Pat. No. 5,771,251, "Optical Fibre Distributed Feedback Laser", to Kringlebotn et al; or U.S. Pat. No. 5,511,083, "Polarized Fiber Laser Source", to D'Amato et al. In that case, a grating 84 is written in a rare-earth doped core and configured to have a phase shift of $\lambda/2$ (where $\lambda$ is the lasing wavelength) at a predetermined location 56 near the center of the grating 16 which provides a well defined resonance condition that may be continuously tuned in single longitudinal mode operation without mode hopping, as is known. Alternatively, instead of a single grating, the two gratings 50,52 (FIG. 3) may be placed close enough to form a cavity having a length of $(N+\frac{1}{2})\lambda$, where N is an integer (including 0) and the gratings 50,52 are in rare-earth doped fiber. The gratings 50,52 may have the same reflection wavelengths and/or profiles or different wavelengths and/or profiles.

Alternatively, the DFB laser 84 may be located between the pair of gratings 50,52 where the core 12 is doped with a rare-earth dopant at least a portion of the distance between the gratings 50,52. Such configuration is referred to as an "interactive fiber laser", such as is described in U.S. Pat. No. 6,018,534, "Fiber Bragg Grating DFB-DBR Interactive Laser and related Fiber Laser Sources", to J. J. Pan et al. Other single or multiple fiber laser configurations configurations may be disposed in the waveguide 10 if desired, such as those described in U.S. Pat. No. 5,910,962, entitled "Multi-wavelength Fiber Laser Source for Fiber Optic Networks" to Pan, et al, or U.S. Pat. No. 5,892,781, entitled "High Output Fiber Amplifier/Lasers for Fiber Optic Networks", to Pan et al.

We have found that an outer diameter d2 of greater than about 300 microns (0.3 mm) provides acceptable results (without buckling or degrading) for handling, grinding, polishing, attaching, grating writing, which is much superior over prior art D-shaped fiber. The longer the desired length of the D-shaped section, the larger the outer diameter d2 will need to be to provide acceptable performance and rigidity.

The large diameter D-shaped optical waveguide 10 may be formed by obtaining the circular waveguide 11 (described hereinafter) and then, a portion of the cladding 14 and/or core 12 (or inner cladding 102 if applicable) is removed to form the surface 100. The surface 100 may be formed by micro machining, grinding, polishing, etching or otherwise formed in waveguide 10 using known techniques. The face of the surface 100 may be further polished or fire polished or otherwise treated to enhance the optical characteristics.

The D-shaped waveguide portion 10 may be made using fiber drawing techniques (discussed hereinafter) now known or later developed that provide the resultant desired dimensions for the core and the cladding. In that case, the external surface of the waveguide will likely be optically flat, thereby allowing Bragg gratings to be written through the cladding similar to that which is done for conventional optical fiber. Alternatively, the D-shaped section may be made by obtaining a circular cane waveguide having the desired outer dimension and then polishing the outer surface and fire polishing if necessary to provide the desired flatness. The circular waveguide may be obtained (as discussed hereinafter, by drawing the cane waveguide, or by collapsing and fusing a tube to an optical fiber. In the event that the surface 100 is not optically flat the grating 16 may be written into the waveguide 10 using an optically flat window and index matching fluid between the window and the surface 100, such as is discussed in U.S. Pat. No. 6,298,184, "Forming a Tube-Encased Fiber Grating", to Putnam.

Figure 24:
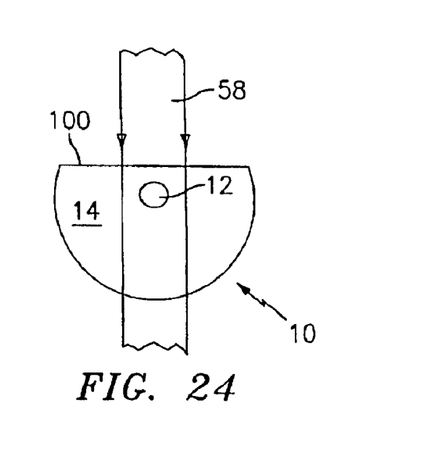
FIG. 24 is an end cross-section view of a large diameter D-shaped optical waveguide having a grating writing beam incident on it, in accordance with the present invention.

Referring to FIG. 24, the invention may also provide some advantages for grating writing into the waveguide in the D-shaped section. For example, there may be less light scatter of the grating writing beams 58 during grating writing due to the flat surface 100 as opposed to writing a grating in a curved surface waveguide which causes a high amount of scatter. Further, if the core 12 is placed close to the surface, e.g., for an evanescent-wave coupler, there may likely be more optical power absorption into the core 12 of the grating writing beams 58 as there is less glass between the core 12 and the writing beams 58. Also, the flat surface 100 may be used for accurate grating writing alignment.

Because the waveguide 10 has a large outer diameter compared to that of a standard optical fiber (e.g., 125 microns), the waveguide 10 does not need to be coated with a buffer (or jacket) and then stripped to write the gratings, thereby requiring less steps than that needed for conventional optical fiber gratings, and preserving the structural integrity and optical properties of the waveguide.

Figure 25:
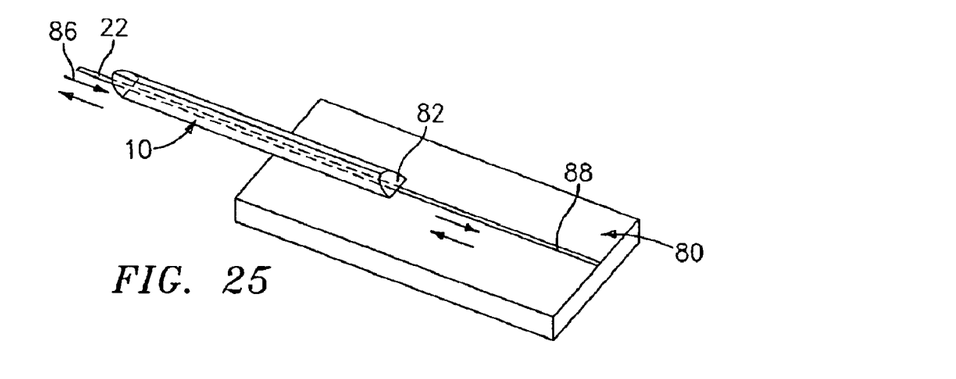
FIG. 25 is a perspective view of a large diameter D-shaped optical waveguide disposed on a planar waveguide, in accordance with the present invention.
Figure 26:
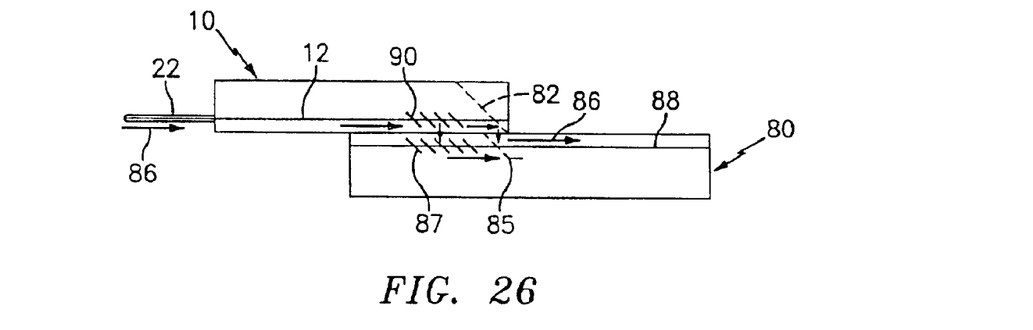
FIG. 26 is a side view of FIG. 25, in accordance with the present invention.

Referring to FIGS. 25 and 26, the D-shaped waveguide 10 may be used to couple light into or out of a planar waveguide 80. The D-shaped waveguide 10 may have an angle polished end face 82 which reflects input light 86 from the fiber 22 to a waveguiding portion 88 of the planar waveguide 80. Alternatively, instead of the angled end face 82, the waveguide 10 may have a blazed grating 90, similar to that discussed hereinbefore with FIGS. 29,30. The planar waveguide 80 has a corresponding blazed grating 87 or angled reflective surface 85 therein, or other optical directing device or feature to allow the light 86 to pass bidirectionally between the core 12 of the waveguide 10 and the waveguiding portion 88. The surface 100 of the waveguide 10 is optically coupled to the upper surface 92 of the planar waveguide 80 using known techniques, e.g., epoxy, fusion, glue, glass solder, etc.

As discussed herein, the D-shaped portion 10 may be used for waveguide orientation or alignment. In particular, referring to FIG. 17, when an elliptical core 66 (or other polarization maintaining geometry) is used, the surface 100 may be used to align the desired polarization axis of the waveguide 10 with those of a connecting waveguide. Referring to FIGS. 26, 29, and 30, this may also be done for alignment of a blazed grating in the waveguide 10 with another waveguide.

Figure 23:
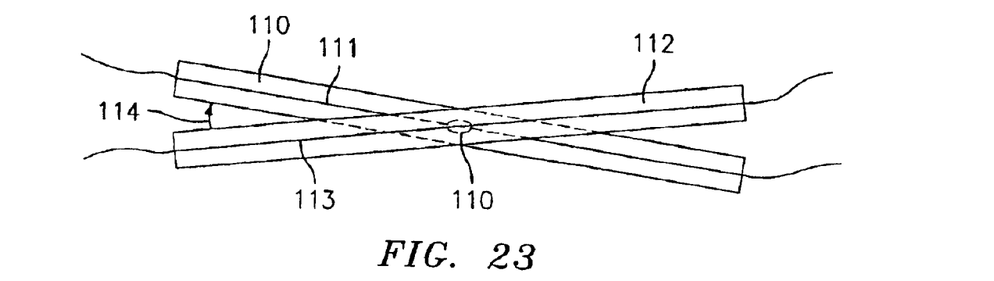
FIG. 23 is a top view of an optical coupler formed from the two large diameter D-shaped optical waveguides, in accordance with the present invention.

Referring to FIG. 23, a pair of D-shaped waveguides 110,112 having cores 111,113, disposed therein respectively, may be used to form a 2×2 optical coupler. In that case, a flat coupling surface (or section) of a first D-shaped waveguide 110 is placed across and in contact with a flat coupling surface (or section) of a second D-shaped waveguide 112. The cores 111,113 intersect and light therefrom will couple between the two waveguides 110,112 at a coupling region 116. The length of the coupling region may be determined by setting the angle 114 between the two waveguides 110,112. The portions of the waveguides 110,112 that are not in contact with each other may be circular waveguide portions discussed hereinbefore, to minimize losses outside the coupling area.

Figure 32:
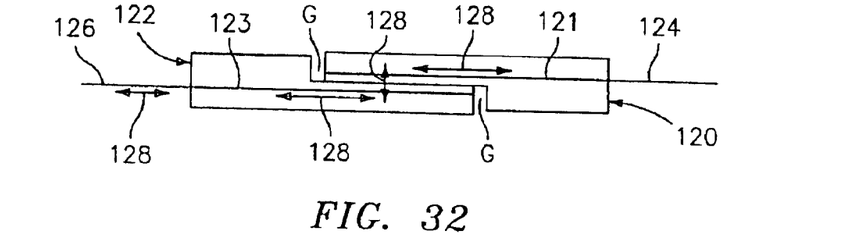
FIG. 32 is a side view of an optical coupler formed from the two large diameter D-shaped optical waveguides, in accordance with the present invention.

Referring to FIG. 32, an alternative coupler embodiment has a first D-shaped waveguide device 120 (similar to the device 9 of FIG. 1), and a second waveguide device 122, each having respective waveguiding regions 121,123, and input/output fibers 124,126 for coupling light 128 between the two fibers. The coupling efficiency may be determined by setting the gap G between the two devices. If the gap G is zero, maximum coupling efficiency exists.

Referring to FIGS. 18–22, another type of coupler can be made by using two circular large diameter waveguides 200,202, as discussed hereinbefore, each having respective waveguiding sections 201,203 and cladding sections 205, 207 and each end having fiber pigtails indicated by lines 206. Then, heating and bending ends away from each other as indicated by the lines 204. Next, a section of each cladding 209,211 is removed, e.g., by polishing, grinding, etching, machining, or other technique, leaving a pair of flat surfaces (the D-shape surfaces) 213,215, sufficient to expose the evanescent fields of each of the waveguides (based on the amount of coupling desired). These surfaces are optically coupled together using known techniques, e.g., optical epoxy, glue, fusion, of other known techniques to form a coupler 220 of FIG. 19. The coupler 220 will couple optical signals between the two waveguides 200,202 over a coupling length Lc. Alternatively, a grating 222 may be disposed at a desired location along the coupling length Lc which may be used to provide various wavelength specific coupling to or from each of the four ports of the device 220, such as is described in copending U.S. patent application, Ser. No. 10/098,925, filed contemporaneously herewith, incorporated herein by reference. A similar coupler in fiber is described in U.S. Pat. Nos. 5,459,801, and 5,459,807 entitled "Coupler Used to Fabricate Add-Drop Devices, Dispersion Compensators, Amplifiers, Oscillators, Superluminescent Devices, and Communications Systems"; and U.S. Pat. No. 5,457,758 "Add Drop Device fo a Wavelength Division Multiple, Fiber Optic Transmission System", all to Snitzer, all incorporated herein by reference.

Figure 20:
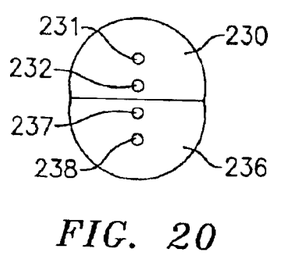
FIG. 20 is an end cross-section view of two coupled large diameter D-shaped optical waveguides having a plurality of optical cores, in accordance with the present invention.
Figure 21:
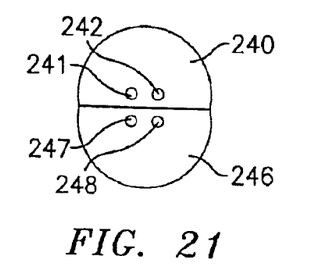
FIG. 21 is an end cross-section view of an alternative embodiment of two coupled large diameter D-shaped optical waveguides having a plurality of optical cores, in accordance with the present invention.
Figure 22:
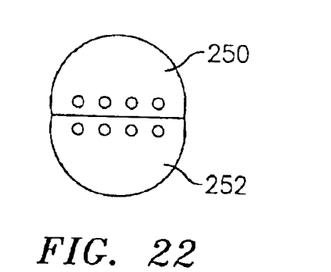
FIG. 22 is an end cross-section view of an alternative embodiment of two coupled large diameter D-shaped optical waveguides having a plurality of optical cores, in accordance with the present invention.

Referring to FIGS. 20–22, instead of coupling together two waveguides each having a single core (or waveguiding section), the D-shaped waveguides may each have multiple cores, as discussed in FIG. 16, to create various different core coupling arrangments as shown in FIGS. 20–22. For example, in FIG. 20, a first D-shaped waveguide 230 may have two cores 231,232 and a second D-shaped waveguide 236 may have two cores 237,238, where the coupling between the cores 232, 237 will be different that the coupling between the cores 231,238. Alternatively, in FIG. 21, a first D-shaped waveguide 240 may have two cores 241,242 and a second D-shaped waveguide 246 may have two cores 247,248, where the coupling between the cores 242, 247 will be substantially the same if the distances are the same. Alternatively, in FIG. 22, any number of cores may be used in each of the D-shaped waveguides 250,252. Also, the number of cores in each D-shaped waveguide need not be the same.

The waveguide 10 may be made using fiber drawing techniques now known or later developed that provide the resultant desired dimensions for the core and the outer diameter discussed hereinbefore. Because the waveguide 10 has a large outer diameter (greater than 0.3 mm) compared to that of a standard optical fiber (e.g., 125 microns), the waveguide 10 may not need to be coated with a buffer (or jacket) and then stripped to perform subsequent machining operations, thereby requiring less steps than that needed for known fiber based optical coupling configurations. Also, the large outer diameter d2 of the waveguide 10 allows the waveguide to be ground, etched or machined while retaining the mechanical strength of the waveguide 10.

The present invention is easily manufactured and easy to handle. Also, the waveguide 10 may be made in long lengths (on the order of many inches, feet, or meters) then cut to size as needed for the desired application.

Alternatively, the D-shaped optical waveguide 10 may be formed directly by drawing the waveguide from a D-shaped preform, as described in commonly owned U.S. patent application Ser. No. 10/098,892, filed contemporaneously herewith, which is incorporated herein by reference. An inner preform may be formed using known methods such as multiple chemical vapor deposition (MCVD), outside vapor-phase deposition (OVD) or vapor-phase axial deposition (VAD) processes to form the core, inner cladding and a portion of the outer cladding having the desired composition of material and dopants. One method of manufacturing the preform is described in U.S. Pat. No. 4,217,027 entitled, "Optical Fiber Fabrication and Resulting Product", which is incorporated herein by reference. A glass tube may then be collapsed onto the inner preform to provide the desired outer diameter of the outer cladding 14 of the preform. After the cylindrical preform is formed, the preform is ground, machined or otherwise formed into the desired D-shape. The preform is then heated and drawn using known techniques to form the D-shaped waveguide 10 having the desired dimensions as described hereinbefore. During the heating and drawing process, the preform is heated to a predetermined temperature to draw the waveguide, but sufficiently cool so that the waveguide maintains the D-shape. The advantage of drawing the D-shaped waveguide is that the flat surface 100 is fired smooth and flat.

Figure 27:
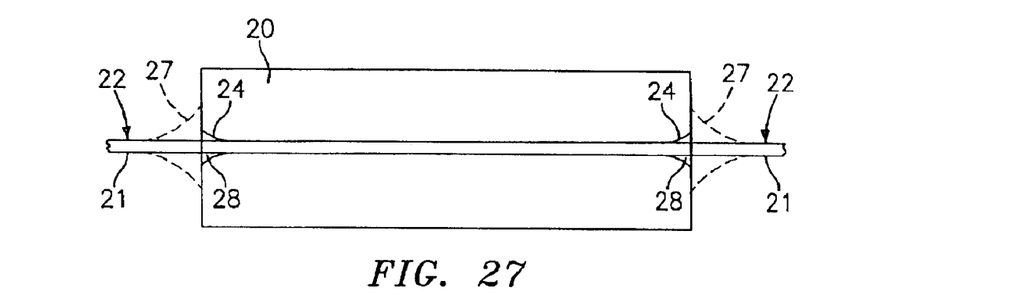
FIG. 27 is a side view of a tube fused to an optical fiber, in accordance with the present invention.

Referring to FIG. 27, alternatively, instead of drawing the D-shaped or circular waveguides as described herein above, any of the large diameter optical waveguide structures described herein may be formed by a glass collapsing and fusing technology shown and described in commonly owned U.S. patent application Ser. No. 09/455,865 (CiDRA File No. CC-0078B), filed Dec. 6, 1999, hereby incorporated by reference in their entirety, as discussed below in more detail. By way of example, the large diameter optical waveguide structures may be formed by taking the optical fiber 22 and inserting it into an alignment tube 20 having an inner diameter slightly larger than that of the outer diameter of the optical fibers, which is then collapsed on the optical fiber 22. When this technique is used, there is need to splice the separate fiber 22 onto the larger diameter waveguides 11 or 10.

One or more tubes may be collapsed around the fiber to form the desired outer diameter. For example, if more than one tube is to be used, a large diameter optical waveguide having an outer diameter of 3 millimeters may be formed by collapsing a first glass tube having a 1 millimeter outer diameter and a bore onto an optical fiber having a diameter of 125 microns arranged therein, then further collapsing a second glass tube having a 3 millimeter outer diameter and a corresponding bore onto the first glass tube arranged therein.

The tube 20 is made of a glass material, such as natural or synthetic quartz, fused silica, silica ($SiO_2$), Pyrex® by Corning (boro silicate), or Vycor® by Corning (about 95% silica and 5% other constituents such as Boron Oxide), or other glasses. The tube should be made of a material such that the tube 20 (or the inner diameter surface of a bore hole in the tube 20) can be fused to (i.e., create a molecular bond with, or melt together with) the outer surface (or cladding) of the optical fiber 10 such that the interface surface between the inner diameter of the tube 20 and the outer diameter of the fiber 10 become substantially eliminated (i.e., the inner diameter of the tube 20 cannot be distinguished from the cladding of the fiber 10).

The axial ends of the tube 20 where the fiber 10 exits the tube 20 may have an inner region 24 which is inwardly tapered (or flared) away from the fiber 10 to provide strain relief for the fiber 10 or for other reasons. In that case, an area 28 between the tube 20 and the fiber 10 may be filled with a strain relief filler material, e.g., polyimide, silicone, or other materials. Alternatively, instead of having the inner tapered region 24, one or both of the axial ends of the tube 20 where the fiber 10 exits the tube 20 may have an outer tapered (or fluted, conical, or nipple) section, shown as dashed lines 27, which has an outer geometry that decreases down to the fiber 10 (discussed more hereinafter with FIG. 12). The fluted sections 27 may provide enhanced pull strength at and near the interface where the fiber 10 exits the tube 20, e.g., 6 lbf or more, when the fiber 10 is pulled along its longitudinal axis.

Where the fiber 10 exits the tube 20, the fiber 10 may have an external protective buffer (or jacket) layer 21 to protect the outer surface of the fiber 22 from damage. The buffer 21 may be made of polyimide, silicone, Teflon® (polytetraflouroethylene), carbon, gold, and/or nickel, and have a thickness of about 25 microns. Other thicknesses and buffer materials for the buffer layer 21 may be used. If the inner tapered region 24 is used and is large enough, the buffer layer 21 may be inserted into the region 24 to provide a transition from the bare fiber to a buffered fiber. Alternatively, if the axial end of the tube 20 has the external taper 27, the buffer 21 would begin where the fiber exits the tapered 27 portion of the tube 20. If the buffer 21 starts after the fiber exit point, the exposed bare portion of the fiber 22 may be recoated with an additional buffer layer (not shown) which covers any bare fiber outside of the tube 20 and may also overlap with the buffer 21 and/or some of the tapered region 27 or other geometrically shaped axial end of the tube 20.

Other techniques may be used for collapsing and fusing the tubes to the fiber, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or other techniques. Alternatively, other techniques may be used to fuse the fiber to the tube, such as using a high temperature glass solder, e.g., a silica solder (powder, liquid or solid), or a liquid silica compound, such that the fiber, the tube and the solder/compound all become fused to each other, or using laser welding/fusing or other fusing techniques.

The dimensions and geometries for any of the embodiments described herein are merely for illustrative purposes and, as such, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. An optical waveguide having outer dimensions measured along longitudinal and transverse directions, comprising:
   an outer cladding having at least one inner core disposed therein which propagates light in substantially a few spatial modes;
   an inner cladding disposed around the inner core
   a reflective element disposed in said waveguide, and
   a portion of the optical waveguide having a generally D-shaped cross-section and a transverse outer waveguide dimension being greater than about 0.3 mm.

2. The optical waveguide of claim 1, wherein said inner core has an outer core dimension of less than about 12.5 microns.

3. The optical waveguide of claim 1, wherein the inner core propagates light in substantially a few spatial modes.

4. The optical waveguide of claim 3, wherein said few spatial modes comprises less than about six spatial modes.

5. The optical waveguide of claim 3, wherein said core propagates light in substantially a single spatial mode.

6. The optical waveguide of claim 1, wherein said reflective element comprises a Bragg grating.

7. The optical waveguide of claim 1, wherein said reflective element is disposed in said core.

8. The optical waveguide of claim 1, wherein at least a portion of said waveguide is doped with a rare-earth dopant where said reflective element is located and said reflective element is configured to form a DFB laser.

9. the optical waveguide of claim 1, wherein said core comprises an asymmetrical cross-sectional shape.

10. The optical waveguide of claim 1, wherein the outer dimension along the transverse dimension of said waveguide is a predetermined value, of said value being about 0.3 mm, 0.4 mm, 0.5 mm, 0.6 mm, 0.7 mm, 0.8 mm, 0.9 mm, 1.0 mm, 1.2 mm, 1.4 mm, 1.6 mm, 1.8 mm, 2.0 mm, 2.1 mm, 2.3 mm, 2.5 mm, 2.7 mm, 2.9 mm, 3.0 mm, 3.3 mm, 3.6 mm, 3.9 mm, 4.0 mm, 4.2 mm, 4.5 mm, 4.7 mm, or 5.0 mm.

11. The optical waveguide of claim 1, wherein said waveguide has a length having a predetermined value, said value being about 3 mm, 5 mm, 7 mm, 9 mm, 10 mm, 12 mm, 14 mm, 16 mm, 18 mm, 20 mm, 21 mm, 23 mm, 25 mm, 27 mm, 29 mm, 30 mm, 32 mm, 34 mm, 36 mm, 38 mm, 40 mm, 45 mm, 50 mm, 55 mm, 60 mm, 65 mm, 70 mm, 75 mm, 80 mm, 85 mm, 90 mm, 95 mm, or 100 mm.

12. The optical waveguide of claim 1, wherein the outer dimension along the transverse dimension of said waveguide is greater than a predetermined value, said value being about 0.3 mm, 0.4 mm, 0.5 mm, 0.6 mm, 0.7 mm, 0.8 mm, 0.9 mm, 1.0 mm, 1.2 mm, 1.4 mm, 1.6 mm, 1.8 mm, 2.0 mm, 2.1 mm, 2.3 mm, 2.5 mm, 2.7 mm, 2.9 mm, 3.0 mm, 3.3 mm, 3.6 mm, 3.9 mm, 4.0 mm, 4.2 mm, 4.5 mm, 4.7 mm, or 5.0 mm.

13. The optical waveguide of claim 1, wherein said waveguide has a length having a predetermined value, said value being about 3 mm, 5 mm, 7 mm, 9 mm, 10 mm, 12 mm, 14 mm, 16 mm, 18 mm, 20 mm, 21 mm, 23 mm, 25 mm, 27 mm, 29 mm, 30 mm, 32 mm, 34 mm, 36 mm, 38 mm, 40 mm, 45 mm, 50 mm, 55 mm, 60 mm, 65 mm, 70 mm, 75 mm, 80 mm, 85 mm, 90 mm, 95 mm, or 100 mm.

14. The optical waveguide of claim 1, wherein said waveguide has a length that is at least 3 mm.

15. The optical waveguide of claim 1, wherein a flat surface defined by the generally D-shaped cross-section pass only through the outer cladding.

16. The optical waveguide of claim 1, wherein a flat surface defined by the generally D-shaped cross-section passes only through the outer cladding and the inner cladding.

17. The optical waveguide of claim 1, wherein a flat surface is defined by the generally D-shaped cross-section and said inner core is located a predetermined distance from said flat surface to allow external coupling of an evanescent field in said cladding.

18. The optical waveguide of claim 17, wherein said predetermined distance is about less than three diameters of said inner core.

19. An optical waveguide having outer dimensions measured along longitudinal and transverse directions, comprising:
an outer cladding having at least one inner core disposed therein which propagates light in substantially a few spatial modes;
an inner cladding disposed around the inner core
a plurality of reflective elements embedded therein, and
a portion of the optical waveguide having a generally D-shaped cross-section and a transverse outer waveguide dimension being greater than about 0.3 mm.

20. An optical waveguide having outer dimensions measured along longitudinal and transverse directions, comprising:
an outer cladding having at least one inner core disposed therein which propagates light in substantially a few spatial modes;
an inner cladding disposed around the inner core
a plurality of said cores, and
a portion of the optical waveguide having a generally D-shaped cross-section and a transverse outer waveguide dimension being greater than about 0.3 mm.

21. An optical waveguide having outer dimensions measured along longitudinal and transverse directions, comprising:
an outer cladding having at least one inner core disposed therein which propagates light in substantially a few spatial modes;
an inner cladding disposed around the inner core
a portion of the optical waveguide having a generally D-shaped cross-section and a transverse outer waveguide dimension being greater than about 0.3 mm;
wherein said waveguide is doped with a rare-earth dopant along at least a portion of said waveguide.

22. An optical waveguide having outer dimensions measured along longitudinal and transverse directions, comprising:
an outer cladding having at least one inner core disposed therein which propagates light in substantially a few spatial modes;
an inner cladding disposed around the inner core
a portion of the optical waveguide having a generally D-shaped cross-section and a transverse outer waveguide dimension being greater than about 0.3 mm;
wherein said waveguide has at least one pair of reflective elements disposed therein and said waveguide is doped with a rare-earth dopant along at least a portion of the distance between said pair of elements to form a fiber laser.

23. An optical waveguide having outer dimensions measured along longitudinal and transverse directions, comprising:
an outer cladding having at least one inner core disposed therein which propagates light in substantially a few spatial modes;
an inner cladding disposed around the inner core
a portion of the optical waveguide having a generally D-shaped cross-section and a transverse outer waveguide dimension being greater than about 0.3 mm;
wherein at least a portion of said waveguide has a cylindrical shape.

24. An optical waveguide having outer dimensions measured along longitudinal and transverse directions, comprising:
an outer cladding having at least one inner core disposed therein which propagates light in substantially a few spatial modes;
an inner cladding disposed around the inner core
a portion of the optical waveguide having a generally D-shaped cross-section and a transverse outer waveguide dimension being greater than about 0.3 mm;
wherein said core comprises a circular end cross-sectional shape.

25. An optical waveguide having outer dimensions measured along longitudinal and transverse directions, comprising:
an outer cladding having at least one inner core disposed therein which propagates light in substantially a few spatial modes;
an inner cladding disposed around the inner core
a portion of the optical waveguide having a generally D-shaped cross-section and a transverse outer waveguide dimension being greater than about 0.3 mm;
wherein the portion of the optical waveguide has a generally polygonal cross-section.

26. An optical waveguide having outer dimensions measured along longitudinal and transverse directions, comprising:
an outer cladding having at least one inner core disposed therein which propagates light in substantially a few spatial modes;
an inner cladding disposed around the inner core
a portion of the optical waveguide having a generally D-shaped cross-section and a transverse outer waveguide dimension being greater than about 0.3 mm;
wherein the index of refraction of the inner core is greater than the index of refraction of the outer cladding and the index of refraction of the inner cladding, and the index of refraction of the inner cladding is greater than the index of refraction of the outer cladding.

27. The optical waveguide of claim 26, wherein the index of the refraction of the inner core is greater than the index of refraction of the outer cladding and the index of the refraction of the inner cladding, and the index of refraction of the inner cladding is less than the index of refraction of the outer cladding.

28. The optical waveguide of claim 26, wherein a flat surface defined by the generally D-shaped cross-section passes only through the outer cladding.

29. The optical waveguide of claim 26, wherein a flat surface defined by the generally D-shaped cross-section passes only through the inner cladding and the outer cladding.

30. The optical waveguide of claim 26, wherein a flat surface defined by the generally D-shaped cross-section passes through the inner core, inner cladding and the outer cladding.

* * * * *